United States Patent
Ouyang et al.

(10) Patent No.: US 10,742,469 B2
(45) Date of Patent: Aug. 11, 2020

(54) METHOD AND APPARATUS FOR DETERMINING TIME OFFSET

(71) Applicant: HUAWEI TECHNOLOGIES CO., LTD., Shenzhen, Guangdong (CN)

(72) Inventors: Tao Ouyang, Wuhan (CN); Syed Habib Rahman, Cupertino, CA (US); Xiaoshu Si, Wuhan (CN); Fan Wang, Wuhan (CN); Hao Lei, Xi'an (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/038,163

(22) Filed: Jul. 17, 2018

(65) Prior Publication Data
US 2019/0007254 A1   Jan. 3, 2019

Related U.S. Application Data

(63) Continuation of application No. PCT/CN2016/071610, filed on Jan. 21, 2016.

(51) Int. Cl.
*H04L 27/26* (2006.01)
*H04L 7/00* (2006.01)
*H04W 56/00* (2009.01)

(52) U.S. Cl.
CPC .......... *H04L 27/2669* (2013.01); *H04L 27/26* (2013.01); *H04L 27/2605* (2013.01);
(Continued)

(58) Field of Classification Search
CPC ............. H04L 27/2655; H04L 27/2662; H04L 27/2628; H04L 27/2614
See application file for complete search history.

(56) References Cited

U.S. PATENT DOCUMENTS

2006/0078040 A1   4/2006   Sung et al.
2006/0098749 A1*  5/2006   Sung ................... H04L 27/2655
                                                              375/260
(Continued)

FOREIGN PATENT DOCUMENTS

CN   101938688 A   1/2011
CN   102238123 A   11/2011
(Continued)

OTHER PUBLICATIONS

Data-Over-Cable Service Interface Specifications, DOCSIS® 3.1, Physical Layer Specification, CM-SP-PHYv3.1-I07-150910, 244 pages.
(Continued)

*Primary Examiner* — Scott M Sciacca
(74) *Attorney, Agent, or Firm* — Womble Bond Dickinson (US) LLP

(57) ABSTRACT

A method and an apparatus for determining a time offset are disclosed. The method includes: obtaining, by a device at a head end, a time-domain signal based on a received signal; and then determining a time offset based on values of peak-to-average ratios of a preset quantity of symbols starting from a $q^{th}$ symbol in the time-domain signal, where a peak-to-average ratio of the $q^{th}$ symbol is greater than a preset threshold. A new method for determining a time offset is provided, and takes advantages that the time-domain signal obtained by the device at the head end has stronger capabilities of resisting interference such as frequency offset and phase noise. The method for determining a time offset can be applied both to initial ranging and periodic ranging.

11 Claims, 7 Drawing Sheets

(52) U.S. Cl.
CPC ...... *H04L 27/2613* (2013.01); *H04L 27/2614* (2013.01); *H04L 27/2628* (2013.01); *H04L 27/2662* (2013.01)

(56) References Cited

U.S. PATENT DOCUMENTS

| | | | | |
|---|---|---|---|---|
| 2007/0053465 | A1* | 3/2007 | Koo | H04L 27/2613 375/303 |
| 2008/0064329 | A1* | 3/2008 | Jung | H04B 7/155 455/18 |
| 2011/0080893 | A1* | 4/2011 | Fong | H04W 36/0055 370/331 |
| 2011/0280349 | A1* | 11/2011 | Hong | H04L 25/0216 375/344 |
| 2013/0332498 | A1* | 12/2013 | Vickers | H03H 17/0213 708/300 |
| 2015/0146712 | A1* | 5/2015 | Jin | H04W 56/006 370/350 |

FOREIGN PATENT DOCUMENTS

| | | |
|---|---|---|
| CN | 103595669 A | 2/2014 |
| CN | 105227392 A | 1/2016 |
| EP | 1760980 A1 | 3/2007 |
| WO | 2011137631 A1 | 11/2011 |

OTHER PUBLICATIONS

Sassan Ahmadi: "Mobile WiMAX: A Systems Approach to Understanding IEEE 802.16m Radio Access Technology", Jan. 1, 2011. XP002787910. pp. 538-542.

InterDigital, Maximum Timing difference for DC uplink synchronous network deployment. 3GPP TSG-RAN WG4 Meeting #74-BIS Rio de Janeiro, BR, Apr. 20-24, 2015, R4-151450, 3 pages.

* cited by examiner

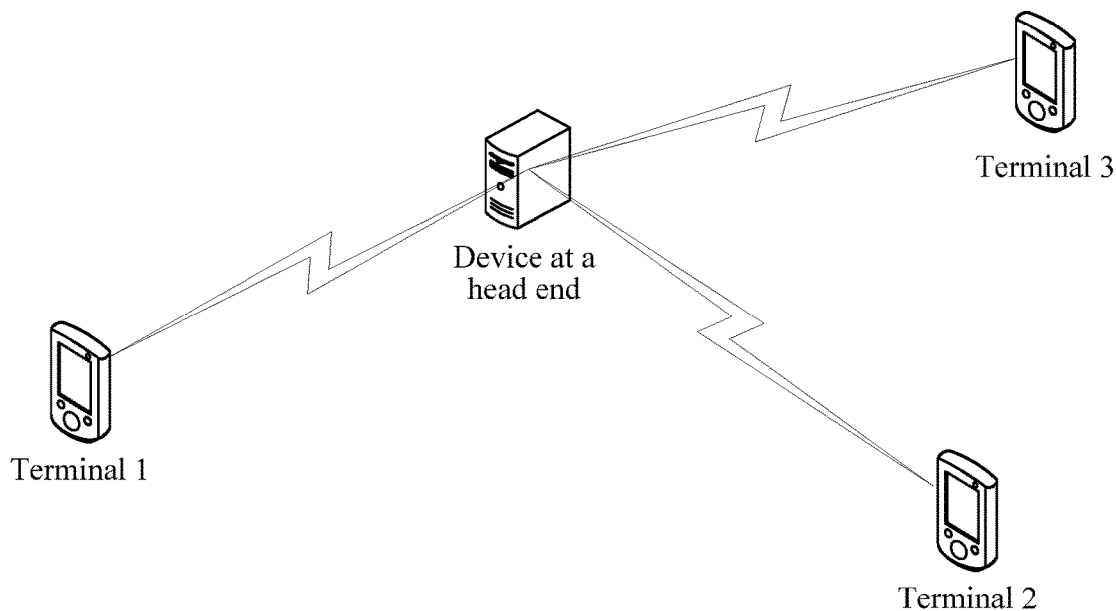

FIG. 4

| A device at a head end obtains a time-domain signal, where the time-domain signal is obtained by the device at the head end based on a signal received by the device at the head end, and the signal received by the device at the head end includes a ranging signal sent by a terminal | 51 |

| The device at the head end determines a time offset based on values of peak-to-average ratios of a preset quantity of symbols starting from a qth symbol in the time-domain signal, where the time offset is a difference between a first time point and a second time point, the first time point is a time point at which the ranging signal sent by the terminal arrives at the device at the head end, the second time point is a preset reference-point time point, and a peak-to-average ratio of the qth symbol is greater than a preset threshold, where q is any integer greater than or equal to 1 | 52 |

FIG. 5

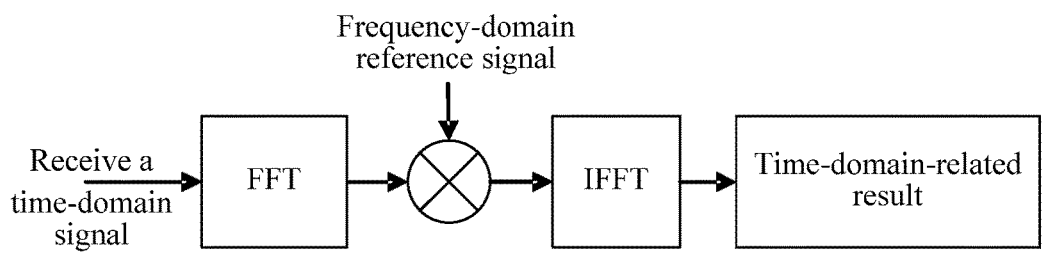

FIG. 6

METHOD AND APPARATUS FOR DETERMINING TIME OFFSET

CROSS-REFERENCE TO RELATED APPLICATIONS

This application is a continuation of International Application No. PCT/CN2016/071610, filed on Jan. 21, 2016, the disclosure of which is hereby incorporated by reference in its entirety.

TECHNICAL FIELD

The present invention relates to the computer field, and in particular, to a method and an apparatus for determining a time offset.

BACKGROUND

Initial ranging (IR) is a process of aligning time points at which signals sent by different terminals arrive at a device at a head end in a multiple-access communications system. When a terminal attempts to access a network, the terminal sends an initial ranging signal to the device at the head end. The device at the head end obtains a time point at which the received initial ranging signal arrives at the device at the head end, uses, based on a preset reference-point time point (for example, a start time point of a timeslot allocated to the terminal), a difference between the two time points as a time offset of the terminal, and then sends the time offset to the terminal. The terminal adjusts, based on the time offset, a time point of sending a signal, so as to ensure that time points at which signals sent by all terminals arrive at the device at the head end are aligned, and ensure normal communication of the multiple-access communications system.

SUMMARY

Embodiments of the present invention provide a method and an apparatus for determining a time offset. The method for determining a time offset can be applied both to initial ranging and periodic ranging, so as to ensure that time points at which signals sent by all terminals arrive at a device at a head end are aligned, and ensure normal communication of a multiple-access communications system.

A first aspect of the embodiments of the present invention provides a method for determining a time offset, where the method includes:

obtaining, by a device at a head end, a time-domain signal based on a signal received by the device at the head end, and where the signal received by the device at the head end includes a ranging signal sent by a terminal; and determining, by the device at the head end, a time offset based on values of peak-to-average ratios of a preset quantity of symbols starting from a $q^{th}$ symbol in the time-domain signal, where the time offset is a difference between a first time point and a second time point, the first time point is a time point at which the ranging signal sent by the terminal arrives at the device at the head end, the second time point is a preset reference-point time point, and a peak-to-average ratio of the $q^{th}$ symbol is greater than a preset threshold, where q is any integer greater than or equal to 1.

The embodiments of the present invention provide a new method for determining a time offset, and the method takes advantages that the time-domain signal obtained by the device at the head end has stronger capabilities of resisting interference such as frequency offset and phase noise.

In one embodiment, the determining, by the device at the head end, a time offset based on values of peak-to-average ratios of a preset quantity of symbols starting from a $q^{th}$ symbol includes:

when there is one symbol whose peak-to-average ratio is greater than the preset threshold in the preset quantity of symbols, and the symbol whose peak-to-average ratio is greater than the preset threshold is the $q^{th}$ symbol, determining, by the device at the head end, the time offset based on a first formula, where the first formula is:

$$TA=(q-2)*Nsymb+Lq-1, \text{ where}$$

TA represents the time offset, Nsymb represents duration occupied by any symbol in the signal received by the device at the head end, and Lq indicates a difference between a sampling-point time point corresponding to a peak of the $q^{th}$ symbol and a start sampling-point time point of the $q^{th}$ symbol.

In one embodiment, the determining, by the device at the head end, a time offset based on values of peak-to-average ratios of a preset quantity of symbols starting from a $q^{th}$ symbol includes:

when there are a plurality of symbols whose peak-to-average ratios are greater than the preset threshold in the preset quantity of symbols, and Pm−Pn>Pn−Threshold, determining, by the device at the head end, the time offset according to a second formula, where the second formula is:

$$TA=(m-2)*Nsymb+Lm-1, \text{ where}$$

the preset threshold is Threshold, Pm is the largest value in the peak-to-average ratios of the preset quantity of symbols, Pn is the second largest value in the peak-to-average ratios of the preset quantity of symbols, TA indicates the time offset, Nsymb indicates duration occupied by any symbol in the signal received by the device at the head end, Lm indicates a difference between a sampling-point time point corresponding to a peak of an $m^{th}$ symbol and a start sampling-point time point of the $m^{th}$ symbol, a peak-to-average ratio of the $m^{th}$ symbol is Pm, a symbol whose peak-to-average ratio is Pn is an $n^{th}$ symbol, and m and n are any integers greater than or equal to q.

In one embodiment, the determining, by the device at the head end, a time offset based on values of peak-to-average ratios of a preset quantity of symbols starting from a $q^{th}$ symbol includes:

when there are a plurality of symbols whose peak-to-average ratios are greater than the preset threshold in the preset quantity of symbols, and Pm−Pn≤Pn−Threshold, determining, by the device at the head end, the time offset according to a third formula, where the third formula is:

$$TA=(k-2)*Nsymb+Lk-1, \text{ where}$$

the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, TA indicates the time offset, Nsymb indicates duration occupied by any symbol in the signal received by the device at the head end, Lk indicates a difference between a sampling-point time point corresponding to a peak of a $k^{th}$ symbol and a start sampling-point time point of the $k^{th}$ symbol, k=min(m,n) and Lk>0.5 time Nfft, Nfft indicates a first Fourier transformation (FFT) length, and m and n are any integers greater than or equal to q.

In one embodiment, the determining, by the device at the head end, a time offset based on values of peak-to-average ratios of a preset quantity of symbols starting from a $q^{th}$ symbol includes:

when there are a plurality of symbols whose peak-to-average ratios are greater than the preset threshold in the preset quantity of symbols, and Pm−Pn≤Pn−Threshold, determining, by the device at the head end, the time offset according to a fourth formula, where the fourth formula is:

$TA=(k-1)*N\text{symb}+Lk-1-CP$, where the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, TA indicates the time offset, Nsymb indicates duration occupied by any symbol in the signal received by the device at the head end, Lk indicates a difference between a sampling-point time point corresponding to a peak of a $k^{th}$ symbol and a start sampling-point time point of the $k^{th}$ symbol k=min(m,n) and Lk≤0.5 time Nfft, Nfft indicates an FFT length, CP indicates duration occupied by a cyclic prefix of any symbol in the signal received by the device at the head end, and m and n are any integers greater than or equal to q.

In one embodiment, the method further includes:

processing, by the device at the head end, a first frequency-domain signal and a frequency-domain reference signal whose parameter is the FFT length in the device at the head end, to obtain a first frequency-domain result, where the first frequency-domain signal is obtained by performing FFT with the FFT length on the signal received by the device at the head end; and performing, by the device at the head end, inverse fast Fourier transformation (IFFT) with the FFT length on the first frequency-domain result, to obtain the time-domain signal.

By using characteristics that a reference signal in the device at the head end is in a frequency domain and a parameter of the reference signal is of the FFT length, FFT is performed on the time-domain signal received by the device at the head end. Correspondingly, the time-domain signal is obtained through FFT, so that implementation complexity and implementation costs are greatly reduced.

In one embodiment, the method further includes:

processing, by the device at the head end, a second frequency-domain signal and a frequency-domain reference signal whose parameter is twice the FFT length, to obtain a second frequency-domain result, where the frequency-domain reference signal whose parameter is twice the FFT length is obtained based on a frequency-domain reference signal whose parameter is the FFT length in the device at the head end, or the frequency-domain reference signal whose parameter is twice the FFT length is obtained by performing FFT of twice the FFT length on a time-domain reference signal, and the second frequency-domain signal is obtained by performing FFT of twice the FFT length on the signal received by the device at the head end; and performing, by the device at the head end, IFFT of twice the FFT length on the second frequency-domain result, to obtain the time-domain signal.

A second aspect of the embodiments of the present invention provides an apparatus for determining a time offset, where the apparatus is configured to perform the method for determining a time offset based on the first aspect.

A third aspect of the embodiments of the present invention provides a device at a head end, including:

a processor, a receiver, a memory, and a bus, where the processor is connected to the memory and the receiver by using the bus;

the receiver is configured to receive a signal including a ranging signal sent by a terminal; and the processor is configured to: obtain a time-domain signal, where the time-domain signal is obtained based on the signal received by the device at the head end; and determine a time offset based on values of peak-to-average ratios of a preset quantity of symbols starting from a $q^{th}$ symbol in the time-domain signal, where the time offset is a difference between a first time point and a second time point, the first time point is a time point at which the ranging signal sent by the terminal arrives at the device at the head end, the second time point is a preset reference-point time point, and a peak-to-average ratio of the $q^{th}$ symbol is greater than a preset threshold, where q is any integer greater than or equal to 1.

In one embodiment, the processor is configured to:

when there is one symbol whose peak-to-average ratio is greater than the preset threshold in the preset quantity of symbols, and the symbol whose peak-to-average ratio is greater than the preset threshold is the $q^{th}$ symbol, determine the time offset based on a first formula, where the first formula is:

$TA=(q-2)*N\text{symb}+Lq-1$, where

TA indicates the time offset, Nsymb indicates duration occupied by any symbol in the signal received by the device at the head end, and Lq indicates a difference between a sampling-point time point corresponding to a peak of the $q^{th}$ symbol and a start sampling-point time point of the $q^{th}$ symbol.

In one embodiment, the processor is configured to:

when there are a plurality of symbols whose peak-to-average ratios are greater than the preset threshold in the preset quantity of symbols, and Pm−Pn>Pn−Threshold, determine the time offset according to a second formula, where the second formula is:

$TA=(m-2)*N\text{symb}+Lm-1$, where the preset threshold is Threshold, Pm is the largest value in the peak-to-average ratios of the preset quantity of symbols, Pn is the second largest value in the peak-to-average ratios of the preset quantity of symbols, TA indicates the time offset, Nsymb indicates duration occupied by any symbol in the signal received by the device at the head end, Lm indicates a difference between a sampling-point time point corresponding to a peak of an $m^{th}$ symbol and a start sampling-point time point of the $m^{th}$ symbol, a peak-to-average ratio of the $m^{th}$ symbol is Pm, a symbol whose peak-to-average ratio is Pn is an $n^{th}$ symbol, and m and n are any integers greater than or equal to q.

In one embodiment, the processor is configured to:

when there are a plurality of symbols whose peak-to-average ratios are greater than the preset threshold in the preset quantity of symbols, and Pm−Pn≤Pn−Threshold, determine the time offset according to a third formula, where the third formula is:

$TA=(k-2)*N\text{symb}+Lk-1$, where the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, TA indicates the time offset, Nsymb indicates duration occupied by any symbol in the signal received by the device at the head end, Lk indicates a difference between a sampling-point time point corresponding to a peak of a $k^{th}$ symbol and a start sampling-point time point of the $k^{th}$ symbol, k=min(m,n) and Lk>0.5 time Nfft, Nfft indicates an FFT length, and m and n are any integers greater than or equal to q.

In one embodiment, the processor is configured to:

when there are a plurality of symbols whose peak-to-average ratios are greater than the preset threshold in the preset quantity of symbols, and Pm−Pn≤Pn−Threshold, determine the time offset according to a fourth formula, where the fourth formula is:

$$TA=(k-1)*Nsymb+Lk-1-CP, \text{ where}$$

the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, TA indicates the time offset, Nsymb indicates duration occupied by any symbol in the signal received by the device at the head end, Lk indicates a difference between a sampling-point time point corresponding to a peak of a $k^{th}$ symbol and a start sampling-point time point of the $k^{th}$ symbol, k=min(m,n) and Lk≤0.5 time Nfft, Nfft indicates an FFT length, CP indicates duration occupied by a cyclic prefix of any symbol in the signal received by the device at the head end, and m and n are any integers greater than or equal to q.

In one embodiment, the processor is further configured to:

process a first frequency-domain signal and a frequency-domain reference signal whose parameter is the FFT length in the device at the head end, to obtain a first frequency-domain result, where the first frequency-domain signal is obtained by performing FFT with the FFT length on the signal received by the device at the head end; and perform IFFT with the FFT length on the first frequency-domain result, to obtain the time-domain signal.

In one embodiment, the processor is further configured to:

process a second frequency-domain signal and a frequency-domain reference signal whose parameter is twice the FFT length, to obtain a second frequency-domain result, where the frequency-domain reference signal whose parameter is twice the FFT length is obtained based on a frequency-domain reference signal whose parameter is the FFT length in the device at the head end, or the frequency-domain reference signal whose parameter is twice the FFT length is obtained by performing FFT of twice the FFT length on a time-domain reference signal, and the second frequency-domain signal is obtained by performing FFT of twice the FFT length on the signal received by the device at the head end; and perform IFFT of twice the FFT length on the second frequency-domain result, to obtain the time-domain signal.

One or more technical solutions provided in the embodiments of the present invention have at least the following technical effects or advantages:

In the embodiments of the present invention, the device at the head end obtains the time-domain signal based on the received signal, and then determines the time offset based on the values of the peak-to-average ratios of the preset quantity of symbols starting from the $q^{th}$ symbol in the time-domain signal, where the peak-to-average ratio of the $q^{th}$ symbol is greater than the preset threshold. A new method for determining a time offset is provided, and takes advantages that the time-domain signal obtained by the device at the head end has stronger capabilities of resisting interference such as frequency offset and phase noise. The method for determining a time offset can be applied both to initial ranging and periodic ranging, so as to ensure that time points at which signals sent by all terminals arrive at the device at the head end are aligned, and ensure normal communication of a multiple-access communications system.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following descriptions show merely some embodiments of the present invention, and a person of ordinary skill in the art may still derive other drawings from these accompanying drawings without creative efforts.

FIG. 4 is a schematic diagram of a communications system architecture to which a method for determining a time offset is applied according to an embodiment of the present invention;

FIG. 5 is a flowchart of a method for determining a time offset according to an embodiment of the present invention;

FIG. 6 is a first flowchart of obtaining a time-domain signal in a method for determining a time offset according to an embodiment of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following further describes the embodiments of the present invention in detail with reference to this specification.

Currently, there are two methods for determining a time offset, and the two methods for determining a time offset are related to a ranging signal. Therefore, the ranging signal is first described.

The ranging signal is applied to a multiple-access communications system. The multiple-access communications system may be an OFDM (Orthogonal Frequency Division Multiplexing) system or an OFDMA (Orthogonal Frequency Division Multiple Access) system, for example, a DOCSIS (Data Over Cable System Interface Specification) 3.1 system and an EPOC (EPON Protocol over Coaxial Distribution Network) system. A CM (Cable Modem) or a CNU (Cable Network Unit) of a terminal sends a ranging signal on some specified subcarriers at an OFDM symbol. The ranging signal occupies only a small segment of a narrowband spectrum relative to a current channel. The ranging signal may be an initial ranging signal or a periodic ranging signal.

Figure 1:
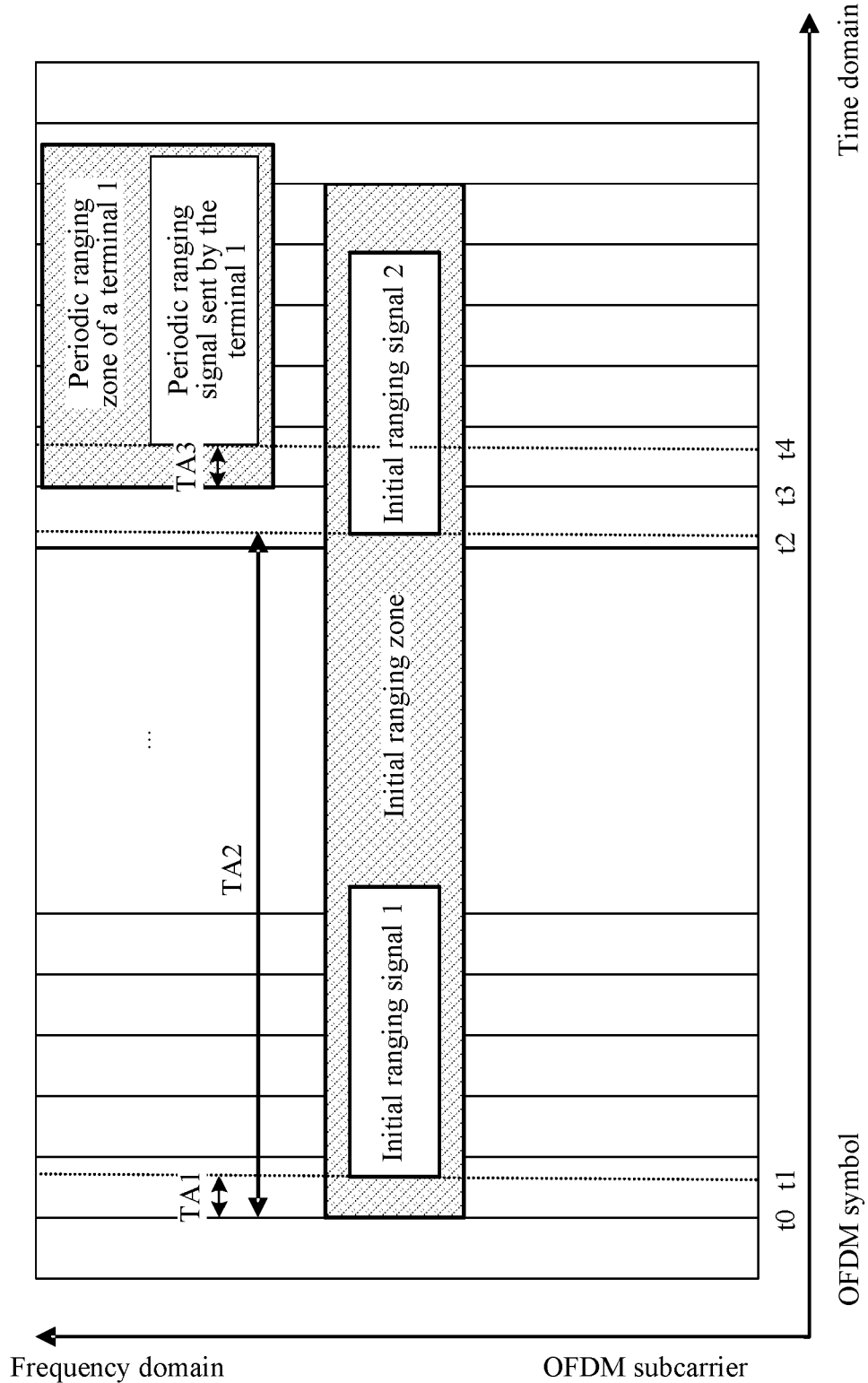
FIG. 1 is a schematic diagram of a time offset according to an embodiment of the present invention.

An example in which the ranging signal is an initial ranging signal is used. As shown in FIG. 1, an initial ranging zone is allocated at an OFDM symbol. Different CMs or CNUs can all send an initial ranging signal in the zone to obtain an opportunity of getting online through registration. A plurality of initial ranging signals may exist in the initial ranging zone, and different initial ranging signals may conflict (that is, overlap) with each other. The conflict leads to a failure of a terminal in getting online through registration, and a corresponding CM or CNU sends the initial ranging signal again in a next initial ranging zone.

An example in which the ranging signal is a periodic ranging signal is used. As shown in FIG. 1, after a terminal 1 is connected to a network, the terminal 1 sends a periodic ranging signal, and a device at a head end allocates a periodic ranging zone to the terminal 1 at an OFDM symbol. The terminal 1 sends the periodic ranging signal in the zone.

Each ranging signal includes a preamble and symbol content (that is, an ID (media access control or MAC address) used to distinguish a CM or a CNU). A device at a head end pre-sends a reference signal to a terminal, and the preamble is a reference signal that is pre-sent by the device at the head end and that is received by the terminal. Due to complexity of a channel, the preamble may be different from the reference signal sent by the device at the head end, but a similarity (which may alternatively be referred to as a correlation) between the preamble and the reference signal sent by the device at the head end is relatively high.

Figure 2:
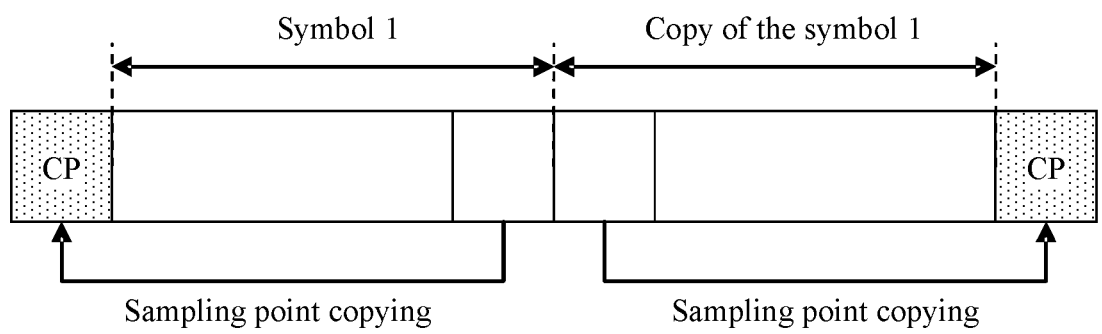
FIG. 2 is a schematic diagram of a ranging signal according to an embodiment of the present invention.

A ranging signal includes a plurality of symbols, and has a feature that the symbols are copied into pairs. As shown in FIG. 2, symbol content of each two of the plurality of symbols included in the ranging signal is totally the same, and a difference is that a cyclic prefix is added to a first symbol, and a cyclic postfix is added to a second symbol. The cyclic prefix and the cyclic postfix are a segment of signal added to each symbol for avoiding interference between symbols. As shown in FIG. 2, a symbol 1 and a symbol 2 are two signals copied into a pair, and symbol content of the symbol 1 is the same as that of the symbol 2. The symbol content includes a plurality of sampling points. The symbol 1 has a cyclic prefix, and the symbol 2 has a cyclic postfix. The cyclic prefix of the symbol 1 is a copy of some sampling points at a tail of the symbol content, and the cyclic postfix of the symbol 2 is a copy of some sampling points at a head of the symbol content.

The foregoing two methods for determining a time offset are respectively a time-domain-related processing method and a frequency-domain phase change method. The two methods are briefly analyzed below.

Figure 3:
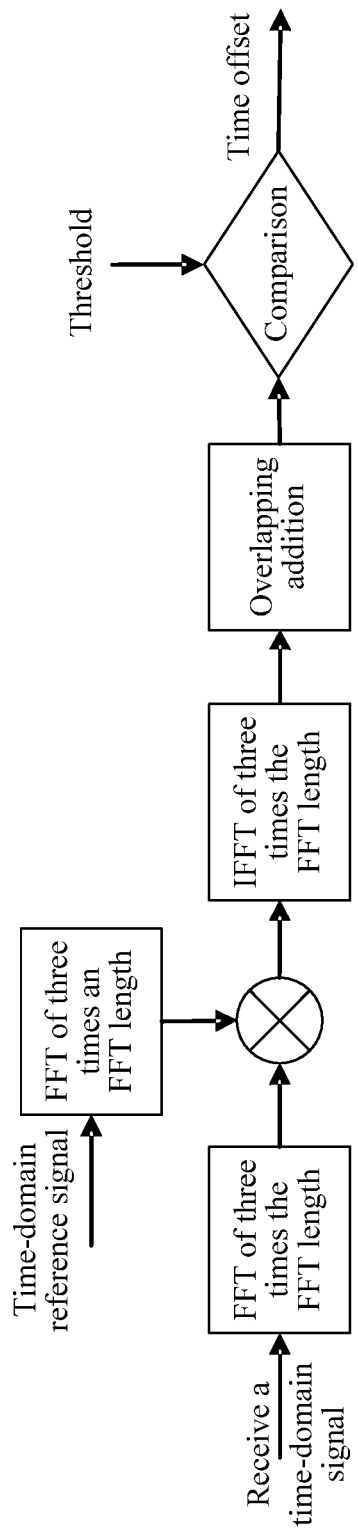
FIG. 3 is a flowchart of a time-domain-related processing method.

In the time-domain-related processing method, that a ranging signal has a feature that symbols are copied into pairs is used, to determine a time offset. Referring to FIG. 3, FIG. 3 is a flowchart of the time-domain-related processing method. The method includes: performing, by a receiver at a head end, FFT of at least three times an FFT (Fast Fourier Transformation) length on a received time-domain signal, to transform the received time-domain signal into a frequency domain, performing FFT of at least three times the FFT length on a local time-domain reference signal, to transform the local time-domain reference signal into the frequency domain, multiplying the two signals, performing IFFT (Inverse fast Fourier transformation) of three times the FFT length, to transform the two signals into a time domain, and adding the two signals by overlapping of twice a symbol length. Two peaks that are approximately equivalent can be obtained based on an output result, and the two peaks are at a distance of the FFT length. A time offset can be obtained by comparing the peaks with a threshold.

However, in the method, FFT/IFFT processing of at least three times the FFT length needs to be performed, and a large amount of data needs to be cached for overlapping addition, causing high operation complexity; in addition, massive memories and multiply-add accumulators are required, leading to high implementation costs.

In the frequency-domain phase change method, a preamble in a ranging signal is used, to determine a time offset. In the frequency-domain phase change method, processing is totally performed in a frequency domain. In an OFDM (Orthogonal Frequency Division Multiplexing) system, without considering impact of a channel, a relationship between a time-domain time offset and phase rotation of a frequency-domain carrier is:

$$\varphi = \frac{2\pi * C}{Nfft} * T.$$

φ is a phase change of the frequency-domain carrier, T is a quantity of time-domain delayed sampling points, Nfft is an FFT length, and C is a number (0, 1, 2, . . . , Nfft−1) of a location of the frequency-domain carrier. The preamble in the ranging signal is known. Therefore, a phase change of a carrier on which the preamble is located can be solved. A phase change caused by a channel can be eliminated by using a preamble on a same carrier. Therefore, the time offset can be calculated based on $$\varphi = \frac{2\pi * C}{Nfft} * T.$$

However, the method has relatively poor precision, and because the phase change is easily affected by frequency offset and noise such as phase noise, phase results corresponding to a plurality of preambles need to be averaged, to obtain a relatively accurate time offset. In addition, a phase periodically and cyclically changes between 0 and $2^\pi$. When different carrier phases change at a boundary of 0 or $2^\pi$, misdetermining easily occurs during calculation.

It can be learned that when the time-domain-related processing method is used to determine a time offset, operation complexity and implementation costs are high. When the frequency-domain phase change method is used to determine a time offset, processing is totally performed in a frequency domain. Therefore, impact of interference such as frequency offset and phase noise on a phase is relatively severe. Phase results corresponding to a plurality of preambles need to be averaged. Therefore, for an initial ranging signal, the initial ranging signal needs to include a plurality of preambles. Consequently, when a plurality of terminals contend for getting online in a same initial ranging zone, a conflict probability and a false detection probability both increase.

To resolve the foregoing problems, an embodiment of the present invention provides a method for determining a time offset. A communications system architecture to which the method for determining a time offset is applied according to this embodiment of the present invention includes: a device at a head end and a plurality of terminals. A communications system satisfying the communications system architecture may be: an OFDM system, an OFDMA (Orthogonal Frequency Division Multiple Access) system, or a wireless communications system. Referring to FIG. 4, an example in which the communications system architecture in FIG. 4 includes a device at a head end and three terminals is used in FIG. 4. The three terminals are respectively a terminal 1, a terminal 2, and a terminal 3.

Referring to FIG. 5, FIG. 5 is a flowchart of a method for determining a time offset according to an embodiment of the present invention. The method for determining a time offset according to this embodiment of the present invention includes the following operations:

Operation 51: A device at a head end obtains a time-domain signal, where the time-domain signal is obtained by the device at the head end based on a signal received by the device at the head end, and the signal received by the device at the head end includes a ranging signal sent by a terminal.

Operation 52: The device at the head end determines a time offset based on values of peak-to-average ratios of a preset quantity of symbols starting from a $q^{th}$ symbol in the time-domain signal, where the time offset is a difference between a first time point and a second time point, the first time point is a time point at which the ranging signal sent by the terminal arrives at the device at the head end, the second time point is a preset reference-point time point, and a peak-to-average ratio of the $q^{th}$ symbol is greater than a preset threshold, where q is any integer greater than or equal to 1.

The signal received by the device at the head end is in a time domain, and includes a ranging signal sent by at least one terminal and a data signal sent by at least one terminal. The ranging signal may be an initial ranging signal or a periodic ranging signal. A correct time offset cannot be directly obtained based on the time-domain signal in operation 51.

Although at least one terminal has sent the ranging signal, the time offset calculated based on the method provided in this embodiment of the present invention is a time offset of one terminal. A specific terminal of which the time offset is can be determined based on a method in the prior art, and details are not described herein.

In this embodiment of the present invention, for an initial ranging signal, a quantity of preambles in the initial ranging signal may be decreased and may be one. In this embodiment of the present invention, the time offset is determined based on the time-domain signal obtained by the device at the head end rather than through phase rotation of a frequency-domain carrier, and there is no need to average phase results corresponding to a plurality of preambles. Therefore, the quantity of preambles in the initial ranging signal may be decreased. For example, there may be one preamble, or two or three preambles in the initial ranging signal in this embodiment of the present invention. The quantity of preambles in the initial ranging signal is decreased, and correspondingly, a proportion of data content in the entire initial ranging signal is increased. Therefore, a quantity of terminals that are in a plurality of terminals and that successfully get online through registration in a same initial ranging zone is increased.

The time offset is the difference between the first time point and the second time point, the first time point is the time point at which the ranging signal sent by the terminal arrives at the device at the head end, and the second time point is the preset reference-point time point.

In one embodiment, the method for determining a time offset not only can be applied to enable, when a terminal attempts to access a network (that is, the terminal performs registration to get online), time points at which signals sent by all terminals including the terminal arrive at the device at the head end to be aligned, but also can be applied to periodically enable, after a terminal is connected to a network (that is, the terminal successfully gets online through registration), a time point at which a signal sent by the terminal arrives at the device at the head end to be aligned with a time point specified by the device at the head end.

When the method for determining a time offset is applied to a scenario in which a terminal attempts to access a network, the time offset is a difference between a time point at which an initial ranging signal sent by the terminal arrives at the device at the head end and a start time point of an initial ranging zone. The time point at which the initial ranging signal sent by the terminal arrives at the device at the head end falls within the initial ranging zone.

For example, an initial ranging zone is shown in FIG. 1. A start time point of the initial ranging zone is t0, a time point at which an initial ranging signal 1 arrives at the device at the head end is t1, a difference between t0 and t1 is a time offset TA1, a time point at which an initial ranging signal 2 arrives at the device at the head end is t2, and a difference between t0 and t2 is a time offset TA2. If a terminal sending the initial ranging signal 1 is a terminal 1, a time offset of the terminal 1 is TA1. If a terminal sending the initial ranging signal 2 is a terminal 2, a time offset of the terminal 2 is TA2.

When the method for determining a time offset is applied to a scenario in which a terminal is connected to a network, the time offset is a difference between a time point at which a periodic ranging signal sent by the terminal arrives at the device at the head end and a start time point of a periodic ranging zone of the terminal. The time point at which the periodic ranging signal sent by the terminal arrives at the device at the head end falls within the periodic ranging zone.

For example, a periodic ranging zone of a terminal 1 is shown in FIG. 1. If a start time point of the periodic ranging zone of the terminal 1 is t3, a time point at which a periodic ranging signal sent by the terminal 1 arrives at the device at the head end is t4, and a difference between t3 and t4 is a time offset TA3, a time offset of the terminal 1 is TA3.

In one embodiment, a possible implementation of operation 51 includes the following operations:

processing, by the device at the head end, a first frequency-domain signal and a frequency-domain reference signal whose parameter is a FFT length in the device at the head end, to obtain a first frequency-domain result, where the first frequency-domain signal is obtained by performing FFT with the FFT length on the signal received by the device at the head end; and performing, by the device at the head end, IFFT with the FFT length on the first frequency-domain result, to obtain the time-domain signal.

In one embodiment, in consideration that a reference signal in the device at the head end is in a frequency domain and a parameter is of the FFT length, and the signal received by the device at the head end is in a time domain, referring to FIG. 6, the device at the head end needs to perform FFT with the FFT length on the received signal to transform the received signal from the time domain to the frequency domain, to obtain the first frequency-domain signal, then multiply the reference signal in the device at the head end by the first frequency-domain reference signal, and perform IFFT with the FFT length, to obtain the time-domain signal.

By using characteristics that a reference signal in the device at the head end is in a frequency domain and a parameter of the reference signal is of the FFT length, FFT is performed on the time-domain signal received by the device at the head end. Correspondingly, the time-domain signal is obtained through FFT, so that implementation complexity and implementation costs are greatly reduced.

In one embodiment, another possible implementation of operation 51 includes the following operations:

processing, by the device at the head end, a second frequency-domain signal and a frequency-domain reference signal whose parameter is twice an FFT length, to obtain a second frequency-domain result, where the frequency-domain reference signal whose parameter is twice the FFT length is obtained based on a frequency-domain reference signal whose parameter is the FFT length in the device at the head end, or the frequency-domain reference signal whose parameter is twice the FFT length is obtained by performing FFT of twice the FFT length on a time-domain reference signal, and the second frequency-domain signal is obtained by performing FFT of twice the FFT length on the signal received by the device at the head end; and performing, by the device at the head end, IFFT of twice the FFT length on the second frequency-domain result, to obtain the time-domain signal.

Figure 7:
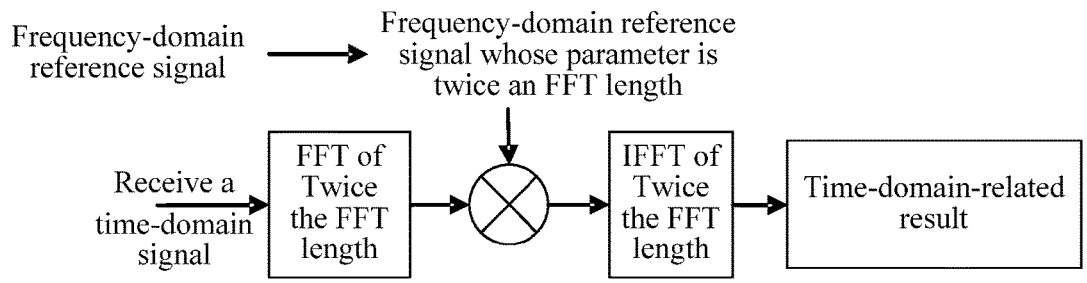
FIG. 7 is a second flowchart of obtaining a time-domain signal in a method for determining a time offset according to an embodiment of the present invention.

In one embodiment, in consideration of characteristics that a reference signal in the device at the head end is in a frequency domain and a parameter of the reference signal is of the FFT length, and the signal received by the device at the head end is in a time domain, referring to FIG. 7, the device at the head end needs to perform FFT of twice the FFT length on the received signal to transform the received signal from the time domain to the frequency domain, to obtain the second frequency-domain signal, then obtain the frequency-domain reference signal whose parameter is twice the FFT length by using the reference signal in the device at the head end, next, multiply the frequency-domain reference signal whose parameter is twice the FFT length by the second frequency-domain signal, and perform IFFT of twice the FFT length, to obtain the time-domain signal.

Figure 8:
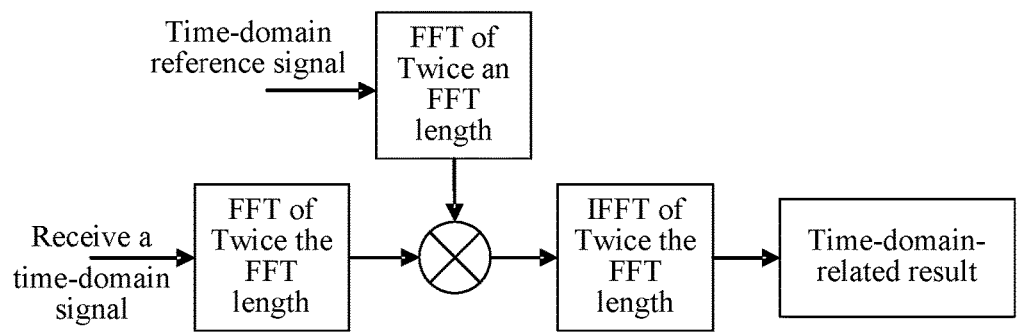
FIG. 8 is a third flowchart of obtaining a time-domain signal in a method for determining a time offset according to an embodiment of the present invention.

Alternatively, referring to FIG. 8, the device at the head end needs to perform FFT of twice the FFT length on the received signal to transform the received signal from a time domain to a frequency domain, to obtain the second frequency-domain signal, perform FFT of twice the FFT length on the time-domain reference signal, to obtain the frequency-domain reference signal whose parameter is twice the FFT length, next, multiply the frequency-domain reference signal whose parameter is twice the FFT length by the second frequency-domain signal, and perform IFFT of twice the FFT length, to obtain the time-domain signal.

The device at the head end obtains the time-domain signal based on the received signal, and determines the time offset based on the obtained time-domain signal. This takes advantages that the obtained time-domain signal has stronger capabilities of resisting interference such as frequency offset and phase noise.

Figure 9:
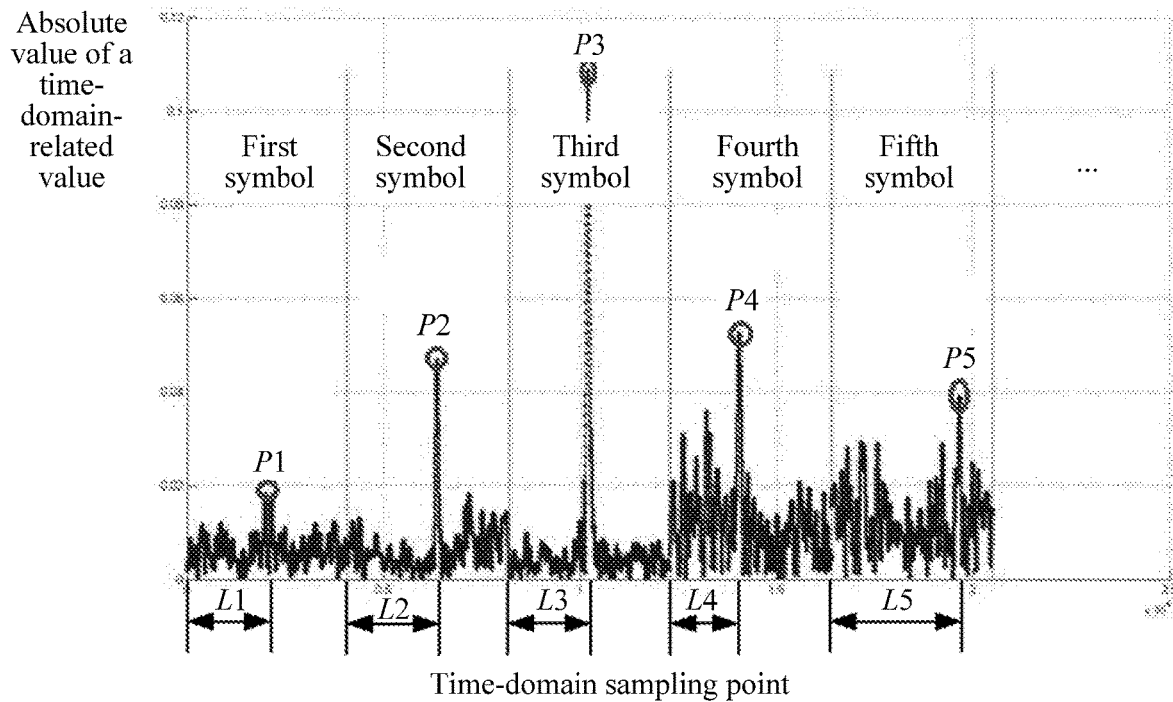
FIG. 9 is a schematic diagram of an obtained time-domain signal according to an embodiment of the present invention.

Referring to FIG. 9, FIG. 9 is a possible schematic diagram of the time-domain signal obtained by the device at the head end. After operation 51 is performed and the time-domain signal is obtained, because power of the signal received by the device at the head end is not determined, a peak-to-average ratio Pi (i represents a symbol number, and i=1, 2, 3, . . . ) of each symbol (a sampling point of the FFT length) in the obtained time-domain signal is respectively solved. Pi is compared with a preset threshold, and an accurate time offset is finally obtained through a series of logical determining.

Figure 10:
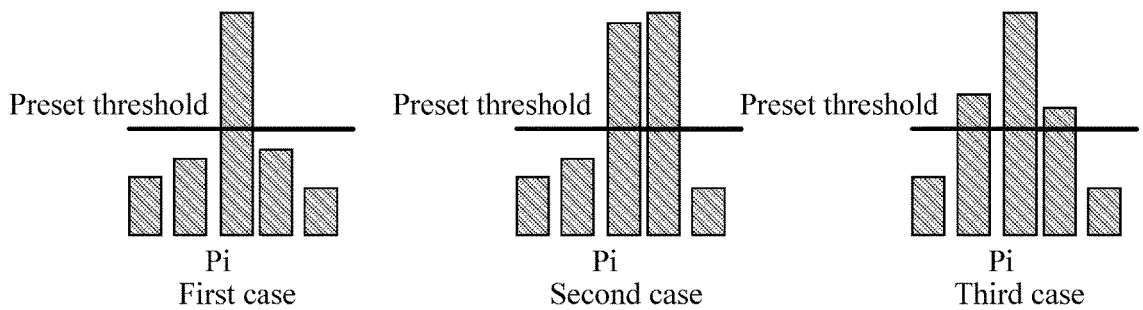
FIG. 10 is a schematic diagram of a peak-to-average ratio of each symbol in an obtained time-domain signal according to an embodiment of the present invention.

In one embodiment, a ranging signal has a feature that symbols are copied into pairs. Therefore, as a distance between the terminal and the head end varies, an obtained time-domain peak-to-average ratio Pi is not fixed, there may be only one Pi exceeding the threshold, or there may be a plurality of Pis exceeding the threshold, and shape regularities are not totally the same. FIG. 10 shows three typical cases. Cases are different as peak-to-average ratios vary. Therefore, the time offset cannot be directly obtained based on a location of a peak, and a correct time offset needs to be obtained through logical determining. A location Li (i=1, 2, 3, . . . , Nfft, and Nfft is the FFT length) of a sampling point corresponding to each Pi in a current symbol is recorded.

Then, it is detected that a Pi exceeds the preset threshold. For convenience of description, the Pi exceeding the preset threshold is denoted as Pq, that is, a peak-to-average ratio of a $q^{th}$ symbol exceeds the preset threshold, where q is any integer greater than or equal to 1.

Next, operation 52 is performed. When it is detected that a Pi (that is, Pq) exceeds the preset threshold, a range (for example, within a plurality of symbols) starting from the $q^{th}$ symbol is set, and a quantity of symbols whose peak-to-average ratios exceed the preset threshold in the range and the peak-to-average ratios of the symbols whose peak-to-average ratios exceed the preset threshold are detected. At last, an accurate time offset is obtained through a series of logical determining.

Assuming that the preset quantity is three, in a first case and a second case shown in FIG. 10, because a peak-to-average ratio of a third symbol is greater than the preset threshold, the preset quantity of symbols is the third symbol, a fourth symbol, and a fifth symbol that start from the third symbol.

Assuming that the preset quantity is four, in a third case shown in FIG. 10, because a peak-to-average ratio of a second symbol is greater than the preset threshold, the preset quantity of symbols is the second symbol, a third symbol, a fourth symbol, and a fifth symbol that start from the second symbol.

Optionally, operation 52 includes the following operations:

when there is one symbol whose peak-to-average ratio is greater than the preset threshold in the preset quantity of symbols, and the symbol whose peak-to-average ratio is greater than the preset threshold is the $q^{th}$ symbol, determining, by the device at the head end, the time offset based on a first formula, where the first formula is:

$$TA=(q-2)*N\text{symb}+Lq-1; \text{ or}$$

when there are a plurality of symbols whose peak-to-average ratios are greater than the preset threshold in the preset quantity of symbols, and Pm−Pn>Pn−Threshold, determining, by the device at the head end, the time offset according to a second formula, where the second formula is:

$$TA=(m-2)*N\text{symb}+Lm-1; \text{ or}$$

when there are a plurality of symbols whose peak-to-average ratios are greater than the preset threshold in the preset quantity of symbols, and Pm−Pn≤Pn−Threshold, and Lk>0.5 time Nfft, determining, by the device at the head end, the time offset according to a third formula, where the third formula is:

$$TA=(k-2)*N\text{symb}+Lk-1, \text{ or}$$

when there are a plurality of symbols whose peak-to-average ratios are greater than the preset threshold in the preset quantity of symbols, and Pm−Pn≥Pn−Threshold, and if Lk≤0.5 time Nfft, determining, by the device at the head end, the time offset according to a fourth formula, where the fourth formula is:

$$TA=(k-1)*N\text{symb}+Lk-1-CP.$$

TA indicates the time offset, Nsymb indicates duration (that is, a sum of Nfft and CP) occupied by any symbol in the signal received by the device at the head end, the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, Lq indicates a difference between a sampling-point time point corresponding to a peak of the $q^{th}$ symbol and a start sampling-point time point of the $q^{th}$ symbol, Lm indicates a difference between a sampling-point time point corresponding to a peak of the $m^{th}$ symbol and a start sampling-point time point of the $m^{th}$ symbol, Lk indicates a difference between a sampling-point time point corresponding to a peak of the $k^{th}$ symbol and a start sampling-point time point of the $k^{th}$ symbol, k=min(m,n), Nfft indicates the FFT length, CP indicates duration occupied by a cyclic prefix of any symbol in the signal received by the head end, and m and n are any integers greater than or equal to q.

Figure 11:
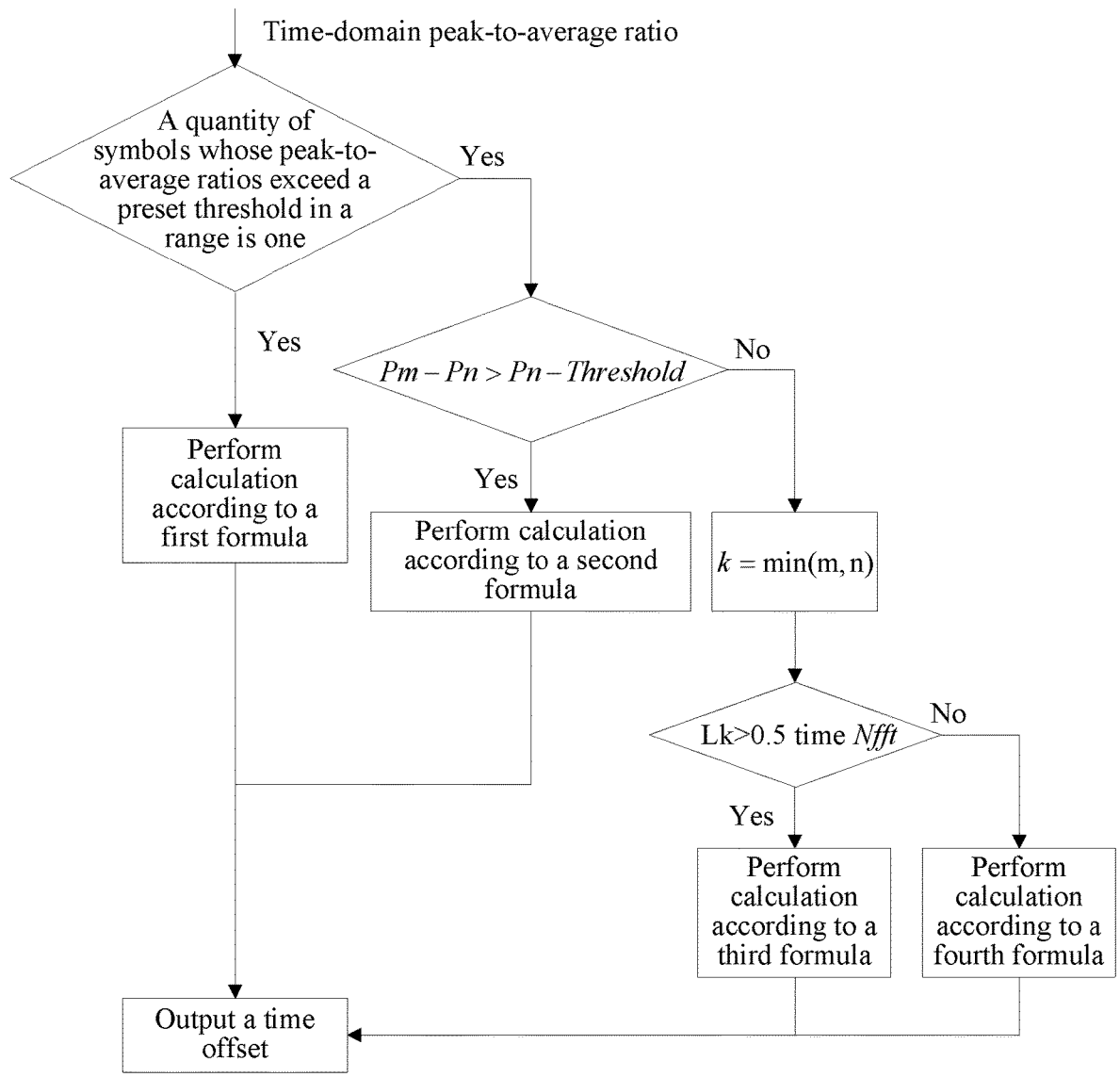
FIG. 11 is another flowchart of a method for determining a time offset according to an embodiment of the present invention.

In one embodiment, referring to FIG. 11, when it is detected that a Pi (that is, Pq) exceeds the preset threshold, a range (for example, within a plurality of symbols) starting from the $q^{th}$ symbol is set, and a quantity of symbols whose peak-to-average ratios exceed the preset threshold in the range and the peak-to-average ratios of the symbols whose peak-to-average ratios exceed the preset threshold are detected. If there is only one Pi, that is, the largest value Pq, exceeding the preset threshold, the $q^{th}$ symbol is selected, and calculation is performed according to the first formula; or if there are a plurality of Pis exceeding the preset threshold, the largest value Pm and the second largest value Pn are found. If Pm−Pn>Pn−Threshold, the $m^{th}$ symbol is selected, and calculation is performed according to the second formula; or if Pm−Pn≤Pn−Threshold, a relatively small value k=min (m,n) is selected from m and n, and Lk is compared with a half the FFT length (0.5*Nfft). If Lk>0.5 time Nfft, the $k^{th}$ symbol is selected, and calculation is performed according to the third formula; or if Lk≤0.5 time, the $k^{th}$ symbol is selected, and calculation is performed according to the fourth formula.

When calculation is performed according to the first formula, a peak-to-average ratio case may be the first case in FIG. 10. When calculation is performed according to the second formula, a peak-to-average ratio case may be the third case in FIG. 10. When calculation is performed according to the third formula or the fourth formula, a peak-to-average ratio case may be the second case in FIG. 10.

Based on a same inventive concept, an embodiment of the present invention further provides an apparatus for determining a time offset. The apparatus for determining a time offset may be the foregoing device at the head end.

Figure 12:
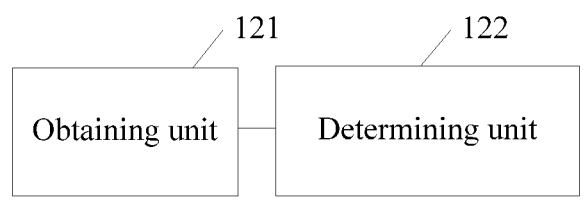
FIG. 12 is a schematic diagram of an apparatus for determining a time offset according to an embodiment of the present invention.

Referring to FIG. 12, FIG. 12 is a schematic diagram of an apparatus for determining a time offset according to an embodiment of the present invention. For meanings and specific implementations of terms related to the apparatus shown in FIG. 12, refer to related descriptions of the embodiments in FIG. 1 to FIG. 11. The apparatus for determining a time offset according to this embodiment of the present invention includes:

an obtaining unit 121, configured to obtain a time-domain signal, where the time-domain signal is obtained based on a signal received by a device at a head end, and the signal received by the device at the head end includes a ranging signal sent by a terminal; and a determining unit 122, configured to determine a time offset based on values of peak-to-average ratios of a preset quantity of symbols starting from a $q^{th}$ symbol in the time-domain signal, where the time offset is a difference between a first time point and a second time point, the first time point is a time point at which the ranging signal sent by the terminal arrives at the device at the head end, the second time point is a preset reference-point time point, and a peak-to-average ratio of the $q^{th}$ symbol is greater than a preset threshold, where q is any integer greater than or equal to 1.

In one embodiment, the determining unit 122 includes:

a first determining subunit, configured to: when there is one symbol whose peak-to-average ratio is greater than the preset threshold in the preset quantity of symbols, and the symbol whose peak-to-average ratio is greater than the preset threshold is the $q^{th}$ symbol, determine the time offset based on a first formula, where the first formula is:

$$TA=(q-2)*N\text{symb}+Lq-1, \text{ where}$$

TA indicates the time offset, Nsymb indicates duration occupied by any symbol in the signal received by the device at the head end, and Lq indicates a difference between a sampling-point time point corresponding to a peak of the $q^{th}$ symbol and a start sampling-point time point of the $q^{th}$ symbol.

In one embodiment, the determining unit 122 includes:

a second determining subunit, configured to: when there are a plurality of symbols whose peak-to-average ratios are greater than the preset threshold in the preset quantity of symbols, and Pm−Pn>Pn−Threshold, determine the time offset according to a second formula, where the second formula is:

$$TA=(m-2)*N\text{symb}+Lm-1, \text{ where}$$

the preset threshold is Threshold, Pm is the largest value in the peak-to-average ratios of the preset quantity of symbols, Pn is the second largest value in the peak-to-average ratios of the preset quantity of symbols, TA indicates the time offset, Nsymb indicates duration occupied by any symbol in the signal received by the device at the head end, Lm indicates a difference between a sampling-point time point corresponding to a peak of an $m^{th}$ symbol and a start sampling-point time point of the $m^{th}$ symbol, a peak-to-average ratio of the $m^{th}$ symbol is Pm, a symbol whose peak-to-average ratio is Pn is an $n^{th}$ symbol, and m and n are any integers greater than or equal to q.

In one embodiment, the determining unit 122 includes:

a third determining subunit, configured to: when there are a plurality of symbols whose peak-to-average ratios are greater than the preset threshold in the preset quantity of symbols, and Pm−Pn≤Pn−Threshold, determine the time offset according to a third formula, where the third formula is:

$$TA=(k-2)*Nsymb+Lk-1, \text{ where}$$

the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, TA indicates the time offset, Nsymb indicates duration occupied by any symbol in the signal received by the device at the head end, Lk indicates a difference between a sampling-point time point corresponding to a peak of a $k^{th}$ symbol and a start sampling-point time point of the $k^{th}$ symbol, k=min(m,n) and Lk>0.5 time Nfft, Nfft indicates an FFT length, and m and n are any integers greater than or equal to q.

In one embodiment, the determining unit 122 includes:

a fourth determining subunit, configured to: when there are a plurality of symbols whose peak-to-average ratios are greater than the preset threshold in the preset quantity of symbols, and Pm−Pn≤Pn−Threshold, determine the time offset according to a fourth formula, where the fourth formula is:

$$TA=(k-1)*Nsymb+Lk-1-CP, \text{ where}$$

the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, TA indicates the time offset, Nsymb indicates duration occupied by any symbol in the signal received by the device at the head end, Lk indicates a difference between a sampling-point time point corresponding to a peak of a $k^{th}$ symbol and a start sampling-point time point of the $k^{th}$ symbol, k=min(m,n) and Lk≤0.5 time Nfft, Nfft indicates an FFT length, CP indicates duration occupied by a cyclic prefix of any symbol in the signal received by the device at the head end, and m and n are any integers greater than or equal to q.

In one embodiment, the apparatus further includes:

a first processing unit, configured to process a first frequency-domain signal and a frequency-domain reference signal whose parameter is the FFT length in the device at the head end, to obtain a first frequency-domain result, where the first frequency-domain signal is obtained by performing FFT with the FFT length on the signal received by the device at the head end; and a first transformation unit, configured to perform, IFFT with the FFT length on the first frequency-domain result, to obtain the time-domain signal.

In one embodiment, the apparatus further includes:

a second processing unit, configured to process a second frequency-domain signal and a frequency-domain reference signal whose parameter is twice the FFT length, to obtain a second frequency-domain result, where the frequency-domain reference signal whose parameter is twice the FFT length is obtained based on a frequency-domain reference signal whose parameter is the FFT length in the device at the head end, or the frequency-domain reference signal whose parameter is twice the FFT length is obtained by performing FFT of twice the FFT length on a time-domain reference signal, and the second frequency-domain signal is obtained by performing FFT of twice the FFT length on the signal received by the device at the head end; and a second transformation unit, configured to perform IFFT of twice the FFT length on the second frequency-domain result, to obtain the time-domain signal.

Various change manners and specific examples in the method for determining a time offset in FIG. 1 to FIG. 11 are also applicable to the apparatus for determining a time offset in this embodiment. Based on the foregoing detailed descriptions of the method for determining a time offset, a person skilled in the art can clearly know a method for implementing the apparatus for determining a time offset in this embodiment. Therefore, for brevity of this specification, details are not described herein.

Figure 13:
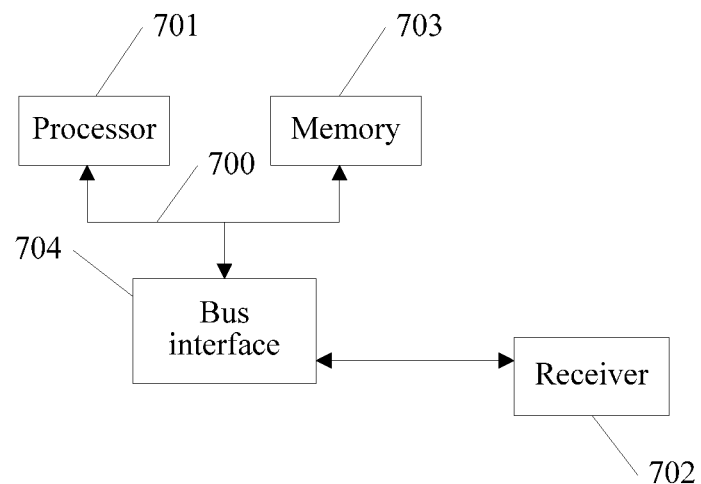
FIG. 13 is a schematic diagram of a device at a head end according to an embodiment of the present invention.

Based on a same inventive concept, an embodiment of the present invention further provides a device at a head end. Referring to FIG. 13, FIG. 13 is a schematic diagram of the device at the head end according to this embodiment of the present invention. For meanings and specific implementations of terms related to the device at the head end shown in FIG. 13, refer to related descriptions of the embodiments in FIG. 1 to FIG. 11. The device at the head end according to this embodiment of the present invention includes:

a processor 701, a receiver 702, a memory 703, and a bus 700, where the processor 701 is connected to the memory 703 and the receiver 702 by using the bus 700.

The receiver 702 is configured to receive a signal including a ranging signal sent by a terminal.

The processor 701 is configured to: obtain a time-domain signal, where the time-domain signal is obtained based on the signal received by the device at the head end; and determine a time offset based on values of peak-to-average ratios of a preset quantity of symbols starting from a $q^{th}$ symbol in the time-domain signal, where the time offset is a difference between a first time point and a second time point, the first time point is a time point at which the ranging signal sent by the terminal arrives at the device at the head end, the second time point is a preset reference-point time point, and a peak-to-average ratio of the $q^{th}$ symbol is greater than a preset threshold, where q is any integer greater than or equal to 1.

In one embodiment, the processor 701 is configured to:

when there is one symbol whose peak-to-average ratio is greater than the preset threshold in the preset quantity of symbols, and the symbol whose peak-to-average ratio is greater than the preset threshold is the $q^{th}$ symbol, determine the time offset based on a first formula, where the first formula is:

$$TA=(q-2)*Nsymb+Lq-1, \text{ where}$$

TA indicates the time offset, Nsymb indicates duration occupied by any symbol in the signal received by the device at the head end, and Lq indicates a difference between a sampling-point time point corresponding to a peak of the $q^{th}$ symbol and a start sampling-point time point of the $q^{th}$ symbol.

In one embodiment, the processor 701 is configured to:

when there are a plurality of symbols whose peak-to-average ratios are greater than the preset threshold in the preset quantity of symbols, and Pm−Pn>Pn−Threshold, determine the time offset according to a second formula, where the second formula is:

$$TA=(m-2)*N\text{symb}+Lm-1, \text{ where}$$

the preset threshold is Threshold, Pm is the largest value in the peak-to-average ratios of the preset quantity of symbols, Pn is the second largest value in the peak-to-average ratios of the preset quantity of symbols, TA indicates the time offset, Nsymb indicates duration occupied by any symbol in the signal received by the device at the head end, Lm indicates a difference between a sampling-point time point corresponding to a peak of an $m^{th}$ symbol and a start sampling-point time point of the $m^{th}$ symbol, a peak-to-average ratio of the $m^{th}$ symbol is Pm, a symbol whose peak-to-average ratio is Pn is an $n^{th}$ symbol, and m and n are any integers greater than or equal to q.

In one embodiment, the processor 701 is configured to:

when there are a plurality of symbols whose peak-to-average ratios are greater than the preset threshold in the preset quantity of symbols, and Pm−Pn≤Pn−Threshold, determine the time offset according to a third formula, where the third formula is:

$$TA=(k-2)*N\text{symb}+Lk-1, \text{ where}$$

the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, TA indicates the time offset, Nsymb indicates duration occupied by any symbol in the signal received by the device at the head end, Lk indicates a difference between a sampling-point time point corresponding to a peak of a $k^{th}$ symbol and a start sampling-point time point of the $k^{th}$ symbol, k=min(m,n) and Lk>0.5 time Nfft, Nfft indicates an FFT length, and m and n are any integers greater than or equal to q.

In one embodiment, the processor 701 is configured to:

when there are a plurality of symbols whose peak-to-average ratios are greater than the preset threshold in the preset quantity of symbols, and Pm−Pn≤Pn−Threshold, determine the time offset according to a fourth formula, where the fourth formula is:

$$TA=(k-1)*N\text{symb}+Lk-1-CP, \text{ where}$$

the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, TA indicates the time offset, Nsymb indicates duration occupied by any symbol in the signal received by the device at the head end, Lk indicates a difference between a sampling-point time point corresponding to a peak of a $k^{th}$ symbol and a start sampling-point time point of the $k^{th}$ symbol, k=min(m,n) and Lk≤0.5 time Nfft, Nfft indicates an FFT length, CP indicates duration occupied by a cyclic prefix of any symbol in the signal received by the device at the head end, and m and n are any integers greater than or equal to q.

In one embodiment, the processor 701 is configured to:

process a first frequency-domain signal and a frequency-domain reference signal whose parameter is the FFT length in the device at the head end, to obtain a first frequency-domain result, where the first frequency-domain signal is obtained by performing FFT with the FFT length on the signal received by the device at the head end; and perform IFFT with the FFT length on the first frequency-domain result, to obtain the time-domain signal.

In one embodiment, the processor 701 is configured to:

process a second frequency-domain signal and a frequency-domain reference signal whose parameter is twice the FFT length, to obtain a second frequency-domain result, where the frequency-domain reference signal whose parameter is twice the FFT length is obtained based on a frequency-domain reference signal whose parameter is the FFT length in the device at the head end, or the frequency-domain reference signal whose parameter is twice the FFT length is obtained by performing FFT of twice the FFT length on a time-domain reference signal, and the second frequency-domain signal is obtained by performing FFT of twice the FFT length on the signal received by the device at the head end; and perform IFFT of twice the FFT length on the second frequency-domain result, to obtain the time-domain signal.

In FIG. 13, a bus architecture (represented by a bus 700) is included. The bus 700 may include any quantity of interconnected buses and bridges, and the bus 700 connects various circuits that include one or more processors represented by the processor 701 and memories represented by the memory 703 together. The bus 700 may further connect various other circuits such as a peripheral device, a voltage regulator, and a power management circuit together. These are all known in the field, and therefore are not further described in this specification. A bus interface 704 provides an interface between the bus 700 and the receiver 702. The receiver 702 may be a transceiver, and provides a unit configured to communicate with various other apparatuses on a transmission medium.

The processor 701 is responsible for management of the bus 700 and normal processing, and the memory 703 may be configured to store data used when the processor 701 performs an operation. Various change manners and specific examples in the method for determining a time offset in FIG. 1 to FIG. 11 are also applicable to the device at the head end in this embodiment. Based on the foregoing detailed descriptions of the method for determining a time offset, a person skilled in the art can clearly know a method for implementing the device at the head end in this embodiment. Therefore, for brevity of this specification, details are not described herein.

In the embodiments of the present invention, the device at the head end obtains the time-domain signal based on the received signal, and then determines the time offset based on the values of the peak-to-average ratios of the preset quantity of symbols starting from the $q^{th}$ symbol in the time-domain signal, where the peak-to-average ratio of the $q^{th}$ symbol is greater than the preset threshold. A new method for determining a time offset is provided, and takes advantages that the time-domain signal obtained by the device at the head end has stronger capabilities of resisting interference such as frequency offset and phase noise. The method for determining a time offset can be applied both to initial ranging and periodic ranging, so as to ensure that time points at which signals sent by all terminals arrive at the device at the head end are aligned, and ensure normal communication of a multiple-access communications system.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk storage, an optical memory, and the like) that include computer-usable program code.

The present invention is described with reference to the flowcharts and/or block diagrams of the method, the device (system), and the computer program product based on the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for determining a time offset, comprising:
   obtaining, by a device at a head end, a time-domain signal based on a signal received by the device at the head end, and wherein the signal received by the device at the head end comprises a ranging signal sent by a terminal; and
   determining, by the device at the head end, a time offset based on values of peak-to-average ratios of a preset quantity of symbols starting from a $q^{th}$ symbol in the time-domain signal, wherein the time offset is a difference between a first time point and a second time point, the first time point is a time point at which the ranging signal sent by the terminal arrives at the device at the head end, the second time point is a preset reference-point time point, and a peak-to-average ratio of the $q^{th}$ symbol is greater than a preset threshold, wherein q is any integer greater than or equal to 1, wherein determining, by the device at the head end, the time offset comprises at least one of:
   when there is one symbol whose peak-to-average ratio is greater than the preset threshold in the preset quantity of symbols, and the symbol whose peak-to-average ratio is greater than the preset threshold is the $q^{th}$ symbol, determining, by the device at the head end, the time offset according to a first formula, wherein the first formula is: TA=(q−2)*Nsymb+Lq−1, where TA represents the time offset, Nsymb represents a duration occupied by any symbol in the signal received by the device at the head end, and Lq represents a difference between a sampling-point time point corresponding to a peak of the $q^{th}$ symbol and a start sampling-point time point of the $q^{th}$ symbol;
   when there are a plurality of symbols whose peak-to-average ratios are greater than the preset threshold in the preset quantity of symbols, and Pm−Pn>Pn−Threshold, determining, by the device at the head end, the time offset according to a second formula, wherein the second formula is: TA=(m−2)*Nsymb+Lm−1, where the preset threshold is Threshold, Pm is the largest value in the peak-to-average ratios of the preset quantity of symbols, Pn is the second largest value in the peak-to-average ratios of the preset quantity of symbols, TA represents the time offset, Nsymb represents a duration occupied by any symbol in the signal received by the device at the head end, Lm represents a difference between a sampling-point time point corresponding to a peak of an $m^{th}$ symbol and a start sampling-point time point of the $m^{th}$ symbol, a peak-to-average ratio of the $m^{th}$ symbol is Pm, a symbol whose peak-to-average ratio is Pn is an $n^{th}$ symbol, and m and n are any integers greater than or equal to q;
   when there are a plurality of symbols whose peak-to-average ratios are greater than the preset threshold in the preset quantity of symbols, and Pm−P≤Pn−Threshold, determining, by the device at the head end, the time offset according to a third formula, wherein the third formula is: TA=(k−2)*Nsymb+Lk−1, where the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, TA represents the time offset, Nsymb represents a duration occupied by any symbol in the signal received by the device at the head end, Lk represents a difference between a sampling-point time point corresponding to a peak of a $k^{th}$ symbol and a start sampling-point time point of the $k^{th}$ symbol, k=min(m, n) and Lk>0.5 time Nfft, Nfft represents a fast Fourier transformation (FFT) length, and m and n are any integers greater than or equal to q; or when there are a plurality of symbols whose peak-to-average ratios are greater than the preset threshold in the preset quantity of symbols, and Pm−Pn≤Pn−Threshold, determining, by the device at the head end, the time offset according to a fourth formula, wherein the fourth formula is: TA=(k−1)*Nsymb+Lk−1−CP, where the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an mth symbol, a symbol whose peak-to-average ratio is Pn is an nth symbol, TA represents the time offset, Nsymb represents a duration occupied by any symbol in the signal received by the device at the head end, Lk represents a difference between a sampling-point time point corresponding to a peak of a kth symbol and a start sampling-point time point of the kth symbol, k=min(m,n) and Lk≤0.5 time Nfft, Nfft represents an FFT length, CP represents a duration occupied by a cyclic prefix of any symbol in the signal received by the device at the head end, and m and n are any integers greater than or equal to q.

2. The method according to claim 1, further comprising:
processing, by the device at the head end, a first frequency-domain signal and a frequency-domain reference signal whose parameter is a fast Fourier transformation (FFT) length in the device at the head end, to obtain a first frequency-domain result, wherein the first frequency-domain signal is obtained by performing an FFT with the FFT length on the signal received by the device at the head end; and
performing, by the device at the head end, inverse a fast Fourier transformation (IFFT) of the FFT length on the first frequency-domain result, to obtain the time-domain signal.

3. The method according to claim 1, further comprising:
processing, by the device at the head end, a second frequency-domain signal and a frequency-domain reference signal whose parameter is twice an FFT length, to obtain a second frequency-domain result, wherein
the frequency-domain reference signal whose parameter is twice the FFT length is obtained based on a frequency-domain reference signal whose parameter is the FFT length in the device at the head end, or the frequency-domain reference signal whose parameter is twice the FFT length is obtained by performing an FFT of twice the FFT length on a time-domain reference signal, and the second frequency-domain signal is obtained by performing an FFT of twice the FFT length on the signal received by the device at the head end; and
performing, by the device at the head end, an IFFT of twice the FFT length on the second frequency-domain result, to obtain the time-domain signal.

4. The method according to claim 1, further comprising:
processing, by the device at the head end, a first frequency-domain signal and a frequency-domain reference signal whose parameter is a fast Fourier transformation (FFT) length in the device at the head end, to obtain a first frequency-domain result, wherein the first frequency-domain signal is obtained by performing an FFT with the FFT length on the signal received by the device at the head end; and
performing, by the device at the head end, an inverse fast Fourier transformation (IFFT) of the FFT length on the first frequency-domain result, to obtain the time-domain signal.

5. The method according to claim 1, further comprising:
processing, by the device at the head end, a second frequency-domain signal and a frequency-domain reference signal whose parameter is twice an FFT length, to obtain a second frequency-domain result, wherein
the frequency-domain reference signal whose parameter is twice the FFT length is obtained based on a frequency-domain reference signal whose parameter is the FFT length in the device at the head end, or the frequency-domain reference signal whose parameter is twice the FFT length is obtained by performing FFT of twice the FFT length on a time-domain reference signal, and the second frequency-domain signal is obtained by performing an FFT of twice the FFT length on the signal received by the device at the head end; and
performing, by the device at the head end, an IFFT of twice the FFT length on the second frequency-domain result, to obtain the time-domain signal.

6. A device at a head end, including:
a processor, a receiver, a memory, and a bus, where the processor is connected to the memory and the receiver via the bus, wherein
the receiver is configured to receive a signal including a ranging signal sent by a terminal; and
the processor is configured to:
obtain a time-domain signal based on the signal received by the receiver; and
determine a time offset based on values of peak-to-average ratios of a preset quantity of symbols starting from a $q^{th}$ symbol in the time-domain signal, where the time offset is a difference between a first time point and a second time point, the first time point is a time point at which the ranging signal sent by the terminal arrives at the device at the head end, the second time point is a preset reference-point time point, and a peak-to-average ratio of the $q^{th}$ symbol is greater than a preset threshold, where q is any integer greater than or equal to 1, wherein the processor is configured to determine the time offset based on at least one of the following:
when there is one symbol whose peak-to-average ratio is greater than the preset threshold in the preset quantity of symbols, and the symbol whose peak-to-average ratio is greater than the preset threshold is the $q^{th}$ symbol, determine the time offset based on a first formula, where the first formula is: TA=(q−2)*Nsymb+Lq−1, where TA represents the time offset, Nsymb represents a duration occupied by any symbol in the signal received by the device at the head end, and Lq represents a difference between a sampling-point time point corresponding to a peak of the $q^{th}$ symbol and a start sampling-point time point of the $q^{th}$ symbol;
when there are a plurality of symbols whose peak-to-average ratios are greater than the preset threshold in the preset quantity of symbols, and Pm−Pn>Pn−Threshold, determine the time offset according to a second formula, where the second formula is: TA=(m−2)*Nsymb+Lm−1, where the preset threshold is Threshold, Pm is the largest value in the peak-to-average ratios of the preset quantity of symbols, Pn is the second largest value in the peak-to-average ratios of the preset quantity of symbols, TA represents the time offset, Nsymb represents a duration occupied by any symbol in the signal received by the device at the head end, Lm represents a difference between a sampling-point time point corresponding to a peak of an $m^{th}$ symbol and a start sampling-point time point of the $m^{th}$ symbol, a peak-to-average ratio of the $m^{th}$ symbol is Pm, a symbol whose peak-to-average ratio is Pn is an $n^{th}$ symbol, and m and n are any integers greater than or equal to q;

when there are a plurality of symbols whose peak-to-average ratios are greater than the preset threshold in the preset quantity of symbols, and Pm−Pn≤Pn−Threshold, determine the time offset according to a third formula, where the third formula is: TA=(k−2)*Nsymb+Lk−1, where the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an $m^{th}$ symbol, a symbol whose peak-to-average ratio is Pn is an $n^{th}$ symbol, TA represents the time offset, Nsymb represents a duration occupied by any symbol in the signal received by the device at the head end, Lk represents a difference between a sampling-point time point corresponding to a peak of a $k^{th}$ symbol and a start sampling-point time point of the $k^{th}$ symbol, k=min(m,n) and Lk>0.5 time Nfft, Nfft indicates an FFT length, and m and n are any integers greater than or equal to q; or when there are a plurality of symbols whose peak-to-average ratios are greater than the preset threshold in the preset quantity of symbols, and Pm−Pn≤Pn−Threshold, determine the time offset according to a fourth formula, where the fourth formula is: TA=(k−1)*Nsymb+Lk−1−CP, where the preset threshold is Threshold, Pm is the largest value in the peak-to-average ratios of the preset quantity of symbols, Pn is the second largest value in the peak-to-average ratios of the preset quantity of symbols, a symbol whose peak-to-average ratio is Pm is an mth symbol, a symbol whose peak-to-average ratio is Pn is an nth symbol, TA represents the time offset, Nsymb represents a duration occupied by any symbol in the signal received by the device at the head end, Lk represents a difference between a sampling-point time point corresponding to a peak of a kth symbol and a start sampling-point time point of the kth symbol, k=min(m,n) and Lk≤0.5 time Nfft, Nfft indicates an FFT length, CP represents a duration occupied by a cyclic prefix of any symbol in the signal received by the device at the head end, and m and n are any integers greater than or equal to q.

7. The device according to claim 6, wherein the processor is further configured to:
process a first frequency-domain signal and a frequency-domain reference signal whose parameter is a fast Fourier transformation (FFT) length in the device at the head end, to obtain a first frequency-domain result, where the first frequency-domain signal is obtained by performing an FFT with the FFT length on the signal received by the device at the head end; and
perform an inverse fast Fourier transformation (IFFT) with the FFT length on the first frequency-domain result, to obtain the time-domain signal.

8. The device according to claim 6, wherein the processor is further configured to:
process a second frequency-domain signal and a frequency-domain reference signal whose parameter is twice an FFT length, to obtain a second frequency-domain result, where
the frequency-domain reference signal whose parameter is twice the FFT length is obtained based on a frequency-domain reference signal whose parameter is the FFT length in the device at the head end, or the frequency-domain reference signal whose parameter is twice the FFT length is obtained by performing an FFT of twice the FFT length on a time-domain reference signal, and the second frequency-domain signal is obtained by performing an FFT of twice the FFT length on the signal received by the device at the head end; and
perform an IFFT of twice the FFT length on the second frequency-domain result, to obtain the time-domain signal.

9. The device according to claim 6, wherein the processor is further configured to:
process a first frequency-domain signal and a frequency-domain reference signal whose parameter is a fast Fourier transformation (FFT) length in the device at the head end, to obtain a first frequency-domain result, where the first frequency-domain signal is obtained by performing an FFT with the FFT length on the signal received by the device at the head end; and
perform an inverse fast Fourier transformation (IFFT) with the FFT length on the first frequency-domain result, to obtain the time-domain signal.

10. The device according to claim 6, wherein the processor is further configured to:
process a second frequency-domain signal and a frequency-domain reference signal whose parameter is twice an FFT length, to obtain a second frequency-domain result, where
the frequency-domain reference signal whose parameter is twice the FFT length is obtained based on a frequency-domain reference signal whose parameter is the FFT length in the device at the head end, or the frequency-domain reference signal whose parameter is twice the FFT length is obtained by performing an FFT of twice the FFT length on a time-domain reference signal, and the second frequency-domain signal is obtained by performing an FFT of twice the FFT length on the signal received by the device at the head end; and
perform an IFFT of twice the FFT length on the second frequency-domain result, to obtain the time-domain signal.

11. A non-transitory machine-readable medium having instructions stored therein, which when executed by a processor, cause the processor to perform a method of determining a time offset, the method comprising:
obtaining, by a device at a head end, a time-domain signal based on a signal received by the device at the head end, and wherein the signal received by the device at the head end comprises a ranging signal sent by a terminal; and
determining, by the device at the head end, a time offset based on values of peak-to-average ratios of a preset quantity of symbols starting from a $q^{th}$ symbol in the time-domain signal, wherein the time offset is a difference between a first time point and a second time point, the first time point is a time point at which the ranging signal sent by the terminal arrives at the device at the head end, the second time point is a preset reference-point time point, and a peak-to-average ratio of the $q^{th}$ symbol is greater than a preset threshold, wherein q is any integer greater than or equal to 1, wherein determining, by the device at the head end, the time offset comprises:

when there is one symbol whose peak-to-average ratio is greater than the preset threshold in the preset quantity of symbols, and the symbol whose peak-to-average ratio is greater than the preset threshold is the $q^{th}$ symbol, determining, by the device at the head end, the time offset according to a first formula, wherein the first formula is:

$$TA=(q-2)*N\text{symb}+Lq-1, \text{wherein}$$

TA represents the time offset, Nsymb represents a duration occupied by any symbol in the signal received by the device at the head end, and Lq represents a difference between a sampling-point time point corresponding to a peak of the $q^{th}$ symbol and a start sampling-point time point of the $q^{th}$ symbol.

* * * * *